W. C. STRAUSS.
FIRELESS COOKER.
APPLICATION FILED APR. 19, 1913.

1,152,861.

Patented Sept. 7, 1915.

WITNESSES.
Charles J. Cobb
L. W. Baldwin

INVENTOR.
Walter C. Strauss
PER
ATTORNEYS.

UNITED STATES PATENT OFFICE.

WALTER C. STRAUSS, OF CHICAGO, ILLINOIS.

FIRELESS COOKER.

1,152,861.  Specification of Letters Patent.  Patented Sept. 7, 1915.

Application filed April 19, 1913. Serial No. 762,193.

*To all whom it may concern:*

Be it known that I, WALTER C. STRAUSS, a citizen of the United States, residing at Chicago, in the county of Cook and State of Illinois, have invented certain new and useful Improvements in Fireless Cookers, of which the following is a description.

My invention belongs to that general class of devices known as fireless cookers or the like, and relates particularly to a device of the kind described in which the heat storing unit or element may be heated or maintained hot without removing the same from the cooker for the purpose of heating the same, that is, charging it with heat, and it may be arranged to work substantially automatically, as will be hereafter explained.

The invention has among its objects the production of a device of the kind described that is simple, convenient, efficient, durable, attractive and satisfactory, that may be manufactured at comparatively small cost, that may be maintained or operated at a minimum or practically no cost, and used wherever found applicable.

To this end my invention consists in the novel construction, arrangement and combination of parts herein shown and described, and more particularly pointed out in the claim.

Figure 1:
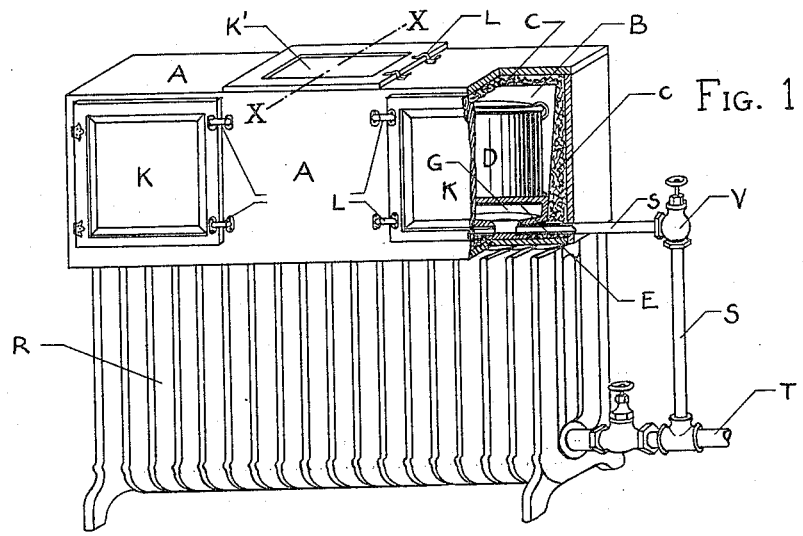
Figure 2:
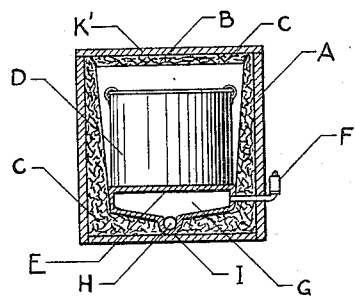
Figure 3:
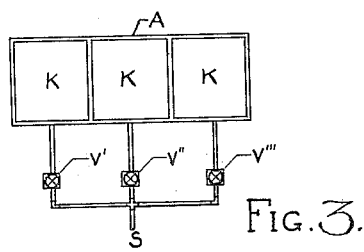
Figure 4:
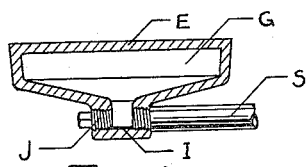

In the drawings, wherein like reference characters indicate like or corresponding parts, Figure 1 is a perspective view of my device used in combination with a radiator, a corner of the cooker broken away to show the construction. Fig. 2 is substantially a cross sectional view of the cooker taken on line X X of Fig. 1. Fig. 3 is substantially a diagrammatic view, showing a slightly modified system of heat supply, and Fig. 4 is a sectional view through the heating element illustrated in Fig. 2.

Referring to the drawings, A represents a suitable outer casing of wood, metal, or the equivalent, provided with suitable doors or covers, and within which are provided one or more heating chambers B. The outer casing is lined with a lining C of asbestos or equivalent insulating material, that will not readily conduct heat. The cooker is constructed in any desired size, the same depending upon the size of the cooking utensils or receptacles D, which are to be employed with the device.

Within each receptacle is arranged a heating element E, which may be termed the heating or heat storing plate. With my device the heating plate E is formed of suitable material, as for example, iron, or the equivalent, with a space or heating chamber G. The plate is provided with an inlet H, through which steam or hot water, or equivalent fluid, may be admitted to the interior of the plate. Where steam, or similar fluid, is used as the heating medium, a relief or air valve F, preferably of automatic construction, is employed, so as to permit the escape of the contained air. The bottom or floor of the chamber preferably slopes, or is inclined toward the inlet, regardless of whether the inlet is at the center of the bottom, as shown, or at one side, so that any condensed steam may flow back into the main supply pipe. This is of importance as otherwise a water pocket might be formed, which would interfere with the operation of the device.

In Fig. 1, three compartments are shown, which are supplied with steam from a supply pipe S, connected to the main pipe T, feeding the radiator R, the cooker being placed upon the top of the radiator. The admission of fluid to the cooker may be controlled by a valve V, or the equivalent. As illustrated in Fig. 1, the pipe S and valve V supply and control the admission of steam to all of the cookers, the connections being made in any suitable manner. As shown, the heating element E is extended as at I for the insertion of the pipe S. The end one may be closed by a plug J on the one side, as illustrated in Fig. 4. This construction permits the heating elements to be made standard. Where it is desired to have a control for each individual cooking chamber or plate, the pipe S may be connected to branch pipes, as illustrated in Fig. 3, which may be separately controlled by the valves V', V" and V"'. With this construction the heating plates E may be formed as shown in Fig. 4, and the plugs J previously mentioned employed to close the extra inlet opening. In the apparatus shown in Fig. 1, two doors K and K are shown at the side, and one door K' at the top, the same being suitably hinged to the receptacle by hinges L, or their equivalents. It should be understood, of course, that the doors or covers may be arranged where found desirable or preferred.

In use, the heating element is preferably heated by means of steam, for example from the heating system, but it should be understood that the device need not necessarily be used in connection with the radiator, as it may be placed wherever found desirable, for example formed in and flush with the side wall, whereby the box is inserted in an opening in the wall and the outer edge thereof lying flush with the said wall when it is not convenient to seat the same upon the radiator and a suitable supply pipe from the source of steam supply being provided. Ventilators (not shown) may also be provided in connection with the same. Not only with the construction as shown is the heating element heated, but it is maintained hot as long as the heating fluid is supplied to the device. In steam heated apartments, for example, the articles may be placed in the cooker early in the evening, and be heated and maintained warm, cooking slowly all night, and in the morning when the heat is turned on early at the source of supply, the heat is automatically supplied to the cooker without further attention. It is customary in most buildings to turn off the heat somewhat late in the evening, and turn it on early in the morning, at the boiler or heater. With the present device, as mentioned, no further attention need be given to the heater, so that the heat is supplied to it substantially automatically, as was mentioned before, when the building heat is turned on. In the winter the device is in operative condition practically all of the time, except, of course, when purposely shut off. A supplemental heating apparatus, or source of supply, may be provided for use in summer (not shown). By using the heating medium employed for heating the apartment, the cost of maintenance is practically nothing, as the amount of heat required, even for an entire season, would be difficult to determine, owing to the small amount diverted to the heater or cooker.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

A fireless cooker of the character described, comprising a casing having a lining of heat insulating material and provided with an opening having a closure therefor, a heat storing and radiating plate having a relatively flat top portion adapted to support a receptacle arranged within the casing, the heat storing and radiating plate being formed hollow to provide an interior chamber to receive the heating medium, the said plate having a horizontally disposed channeled extension at its lower end adapted to rest against the bottom of the casing to constitute a supporting and positioning means for the heat storing chamber at the center thereof and connecting with said interior hollow chamber, the bottom wall of the interior chamber gradually sloping toward the said channeled extension and resting on the insulating material, means for supplying steam to the interior chamber of the heat storing and radiating plate, comprising a combined supply and drain pipe leading from the exterior of the casing and extending horizontally through the wall of the casing adjacent the bottom thereof and connecting with said horizontally disposed channeled extension of the heat storing and radiating plate, substantially as described.

In testimony whereof, I have hereunto signed my name in the presence of two subscribing witnesses.

WALTER C. STRAUSS.

Witnesses:
 ROY W. HILL,
 CHARLES I. COBB.

Copies of this patent may be obtained for five cents each, by addressing the "Commissioner of Patents, Washington, D. C."